United States Patent
Salter et al.

(10) Patent No.: US 10,179,542 B1
(45) Date of Patent: Jan. 15, 2019

(54) VEHICLE CLIMATE STATUS INDICATOR

(71) Applicant: Ford Global Technologies, LLC, Dearborn, MI (US)

(72) Inventors: Stuart C. Salter, White Lake, MI (US); Gary D. Mullen, Plymouth, MI (US); James J. Surman, Clinton Township, MI (US); Wei Xu, Nanjing (CN); Satyanarayana Raju Vemulapati, Westland, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/787,873

(22) Filed: Oct. 19, 2017

(51) Int. Cl.
*F21V 8/00* (2006.01)
*B60Q 9/00* (2006.01)
*G08B 5/38* (2006.01)
*G08B 5/36* (2006.01)

(52) U.S. Cl.
CPC ............. *B60Q 9/00* (2013.01); *G02B 6/0001* (2013.01); *G08B 5/36* (2013.01); *G08B 5/38* (2013.01)

(58) Field of Classification Search
None
See application file for complete search history.

(56) References Cited

U.S. PATENT DOCUMENTS

| | | | | |
|---|---|---|---|---|
| 4,479,115 A | * | 10/1984 | Holzhauer | H05K 7/20209 340/530 |
| 5,889,469 A | * | 3/1999 | Mykytiuk | F04D 27/008 318/434 |
| 6,040,534 A | | 3/2000 | Beukema | |
| 7,731,403 B2 | | 6/2010 | Lynam et al. | |
| 7,898,531 B2 | | 3/2011 | Bowden et al. | |
| 8,330,385 B2 | | 12/2012 | Salter et al. | |
| 8,820,994 B2 | | 9/2014 | Krier | |
| 2008/0157605 A1 | * | 7/2008 | Bowden | B60K 37/06 307/116 |
| 2009/0091943 A1 | * | 4/2009 | Hotary | B60Q 3/68 362/488 |
| 2009/0298406 A1 | * | 12/2009 | Norbury, Jr. | B60H 1/34 454/69 |
| 2011/0108632 A1 | * | 5/2011 | Brandenburg | A61L 9/12 239/34 |
| 2015/0151607 A1 | * | 6/2015 | Weber | B60H 1/00207 454/152 |

FOREIGN PATENT DOCUMENTS

| DE | 102013113319 B3 | * | 11/2014 | ......... B60H 1/00207 |
|---|---|---|---|---|
| EP | 0155913 A1 | | 9/1985 | |
| JP | 2014186403 | * | 10/2014 | ............. G06F 3/041 |

* cited by examiner

*Primary Examiner* — Chico A Foxx
(74) *Attorney, Agent, or Firm* — Vichit Chea; Price Heneveld LLP (57) ABSTRACT

A climate status indicator for a vehicle includes a light guide positioned around a vent perimeter. The climate status indicator additionally includes a light device coupled to at least one vent fin. The light guide and/or the light device are configured to provide a visual indicator of a climate status.

20 Claims, 7 Drawing Sheets

VEHICLE CLIMATE STATUS INDICATOR

FIELD OF THE INVENTION

The present invention generally relates to a visual indicator for a vehicle climate control system, and more particularly, to a climate status indicator that can visually cue a user regarding the vehicle's climate and/or heating, ventilation, and air conditioning (HVAC) system.

BACKGROUND OF THE INVENTION

The use of indicators in automotive vehicles to provide feedback on the various electrical, climate, and driving systems that are provided to a user are in a continual state of development to improve convenience and accessibility to information for the driver. With the increased crowding of information on displays and the decreased cost of electronics, opportunities exist to better deliver information to a driver while making this delivery more intuitive. Although vehicles typically include a variety of different interfaces for the user to control the HVAC system of the vehicle, improved cues, interfaces, and designs are needed to make the interface between the driver and vehicle easier and more efficient.

SUMMARY OF THE INVENTION

According to one aspect of the present disclosure, a climate status indicator is provided. The climate status indicator includes a light guide positioned around a vent perimeter and a light device coupled to at least one vent fin. The light guide and/or the light device are configured to provide a visual indicator of a climate status.

Embodiments of the first aspect of the invention can include any one or a combination of the following features:
  the light guide comprises a first capacitive touch sensor;
  the light device comprises a second capacitive touch sensor;
  the light guide is configured to indicate a fan speed using a lighting pulse rate and to indicate an air temperature using a lighting color;
  the light device is configured to indicate a desired fan speed using a lighting pulse rate and to indicate a desired air temperature using a lighting color;
  the climate status indicator is configured to activate a climate control screen on a display when the climate status indicator is touched;
  the climate status indicator is controlled by a controller, wherein the controller receives information from a vent pressure sensor, a variable air conditioner compressor sensor, an electric air conditioner compressor sensor, an electric heater sensor, an air conditioner sensor, a power sensor, an air quality sensor, an air filter sensor, an air temperature sensor, a fan speed sensor, a vent opening sensor, or a combination thereof;
  the visual indicator is a lighting color, a lighting pulse rate, or a combination thereof;
  the lighting color is blue to indicate an air conditioner status, red to indicate a heater status, orange to indicate a fan status, purple to indicate an air quality status, green to indicate a filter status, indigo to indicate a vent pressure status, or a combination thereof;
  the climate status indicator further comprising a luminescent structure disposed on a vehicle and excitable by emitted light from a light source.

According to another aspect of the present disclosure, a climate status indicator is provided. The climate status indicator includes a vent opening having a light guide with a first capacitive touch sensor or a light device having a second capacitive touch sensor wherein the light device is coupled to at least one vent fin. The light guide and/or the light device are configured to provide a visual indicator of a climate status.

Embodiments of the second aspect of the invention can include any one or a combination of the following features:
  the light guide is configured to indicate a fan speed using a lighting pulse rate and to indicate an air temperature using a lighting color;
  the light device is configured to indicate a desired fan speed using a lighting pulse rate and to indicate a desired air temperature using a lighting color;
  the visual indicator is a lighting color, a lighting pulse rate, or a combination thereof;
  the lighting color is blue to indicate an air conditioner status, red to indicate a heater status, orange to indicate a fan status, purple to indicate an air quality status, green to indicate a filter status, indigo to indicate a vent pressure status, or a combination thereof;
  the climate status indicator is configured to activate a climate control screen on a display when the climate status indicator is touched.

According to yet another aspect of the present disclosure, a method of generating a visual indication for a climate system in a vehicle is provided. The method includes sensing with a sensor a user touching a light guide or a light device on a vent. The method additionally includes activating one or more visual indicators having a lighting color, a lighting pulse rate, or a combination thereof based on the sensed touch.

Embodiments of the third aspect of the invention can include any one or a combination of the following features:
  the climate status indicator is configured to activate a climate control screen on a display when the climate status indicator is touched;
  the climate status indicator is controlled by a controller wherein the controller receives information from a vent pressure sensor, a variable air conditioner compressor sensor, an electric air conditioner compressor sensor, an electric heater sensor, an air conditioner sensor, a power sensor, an air quality sensor, an air filter sensor, an air temperature sensor, a fan speed sensor, a vent opening sensor, or a combination thereof;
  the lighting color is blue to indicate an air conditioner status, red to indicate a heater status, orange to indicate a fan status, purple to indicate an air quality status, green to indicate a filter status, indigo to indicate a vent pressure status, or a combination thereof.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
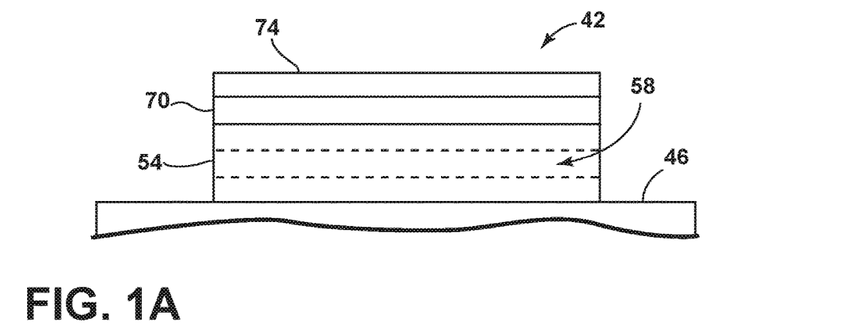
FIG. 1A is a side view of a luminescent structure rendered as a coating for use in a luminescent latch assembly according to one aspect of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a climate status indicator 10 for a vehicle 14. The climate status indicator 10 may advantageously employ one or more phosphorescent and/or luminescent structures to illuminate in response to predefined events. The one or more luminescent structures may be configured to convert excitation light received from an associated light source and re-emit the light at a different wavelength typically found in the visible spectrum.

Figure 1B:
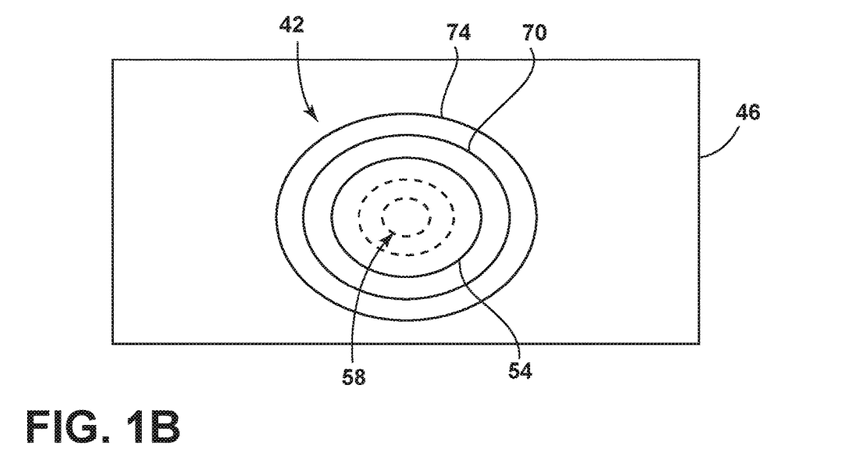
FIG. 1B is a top view of a luminescent structure rendered as a discrete particle according to one aspect of the present disclosure.
Figure 1C:
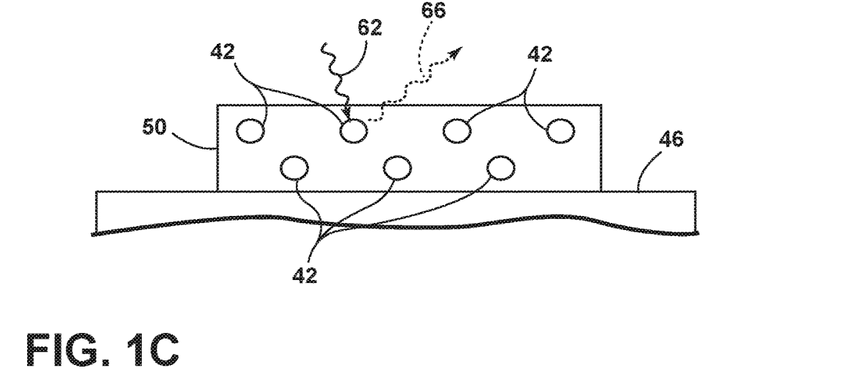
FIG. 1C is a side view of a plurality of luminescent structures rendered as discrete particles and incorporated into a separate structure according to one aspect of the present disclosure.

Referring to FIGS. 1A-1C, various exemplary embodiments of luminescent structures 42 are shown, each capable of being coupled to a substrate 46, which may correspond to a vehicle fixture or vehicle related piece of equipment. In FIG. 1A, the luminescent structure 42 is generally shown rendered as a coating (e.g., a film) that may be applied to a surface of the substrate 46. In FIG. 1B, the luminescent structure 42 is generally shown as a discrete particle capable of being integrated with a substrate 46. In FIG. 1C, the luminescent structure 42 is generally shown as a plurality of discrete particles that may be incorporated into a support medium 50 (e.g., a film) that may then be applied (as shown) or integrated with the substrate 46.

At the most basic level, a given luminescent structure 42 includes an energy conversion layer 54 that may include one or more sublayers, which are exemplarily shown through broken lines in FIGS. 1A and 1B. Each sublayer of the energy conversion layer 54 may include one or more luminescent materials 58 having energy converting elements with phosphorescent or fluorescent properties. Each luminescent material 58 may become excited upon receiving an excitation light 62 of a specific wavelength, thereby causing the light to undergo a conversion process. Under the principle of down conversion, the excitation light 62 is converted into a longer wavelength, converted light 66 that is outputted from the luminescent structure 42. Conversely, under the principle of up conversion, the excitation light 62 is converted into a shorter wavelength light that is outputted from the luminescent structure 42. When multiple distinct wavelengths of light are outputted from the luminescent structure 42 at the same time, the wavelengths of light may mix together and be expressed as a multicolor light.

Light emitted by a light source 94 (FIG. 6) is referred to herein as excitation light 62 and is illustrated herein as solid wavy arrows. In contrast, light emitted from the luminescent structure 42 is referred to herein as luminescence by the luminescent structure 42, or converted light 66, and is illustrated herein as broken wavy arrows. The mixture of excitation light 62 and converted light 66 that may be emitted simultaneously is referred to herein as emitted light.

The energy conversion layer 54 may be prepared by dispersing the luminescent material 58 in a polymer matrix to form a homogenous mixture using a variety of methods. Such methods may include preparing the energy conversion layer 54 from a formulation in a liquid carrier support medium 50 and coating the energy conversion layer 54 to a desired substrate 46. The energy conversion layer 54 may be applied to a substrate 46 by painting, screen-printing, spraying, slot coating, dip coating, roller coating, and bar coating. Alternatively, the energy conversion layer 54 may be prepared by methods that do not use a liquid carrier support medium 50. For example, the energy conversion layer 54 may be rendered by dispersing the luminescent material 58 into a solid-state solution (homogenous mixture in a dry state) that may be incorporated in a polymer matrix, which may be formed by extrusion, injection molding, compression molding, calendaring, thermoforming, etc. The energy conversion layer 54 may then be integrated into a substrate 46 using any methods known to those skilled in the art. When the energy conversion layer 54 includes sublayers, each sublayer may be sequentially coated to form the energy conversion layer 54. Alternatively, the sublayers can be separately prepared and later laminated or embossed together to form the energy conversion layer 54. Alternatively still, the energy conversion layer 54 may be formed by coextruding the sublayers.

In some embodiments, the converted light 66 that has been down converted or up converted may be used to excite other luminescent material(s) 58 found in the energy conversion layer 54. The process of using the converted light 66 outputted from one luminescent material 58 to excite another, and so on, is generally known as an energy cascade and may serve as an alternative for achieving various color expressions. With respect to either conversion principle, the difference in wavelength between the excitation light 62 and the converted light 66 is known as the Stokes shift and serves as the principle driving mechanism for an energy conversion process corresponding to a change in wavelength of light. In the various embodiments discussed herein, each of the luminescent structures 42 may operate under either conversion principle.

Referring back to FIGS. 1A and 1B, the luminescent structure 42 may optionally include at least one stability layer 70 to protect the luminescent material 58 contained within the energy conversion layer 54 from photolytic and thermal degradation. The stability layer 70 may be configured as a separate layer optically coupled and adhered to the energy conversion layer 54. Alternatively, the stability layer 70 may be integrated with the energy conversion layer 54. The luminescent structure 42 may also optionally include a protective layer 74 optically coupled and adhered to the stability layer 70 or other layer (e.g., the conversion layer 54 in the absence of the stability layer 70) to protect the luminescent structure 42 from physical and chemical damage arising from environmental exposure. The stability layer 70 and/or the protective layer 74 may be combined with the energy conversion layer 54 through sequential coating or printing of each layer, sequential lamination or embossing, or any other suitable means.

Additional information regarding the construction of luminescent structures 42 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in their entirety.

According to one embodiment, the luminescent material 58 may include organic or inorganic fluorescent dyes including rylenes, xanthenes, porphyrins, and phthalocyanines. Additionally, or alternatively, the luminescent material 58 may include phosphors from the group of Ce-doped garnets such as YAG:Ce and may be a short persistence luminescent material 58. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 62 and the moment when the light intensity of the converted light 66 emitted from the luminescent structure 42 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the luminescent material 58 with ultra-short persistence characteristics, which can emit the converted light 66 by absorbing purple to blue excitation light 62 emitted from light source 94. According to one embodiment, a ZnS:Ag phosphor may be used to create a blue converted light 66. A ZnS:Cu phosphor may be utilized to create a yellowish-green converted light 66. A $Y_2O_2S$:Eu phosphor may be used to create red converted light 66. Moreover, the aforementioned phosphorescent materials may be combined to form a wide range of colors, including white light. It will be understood that any short persistence luminescent material known in the art may be utilized without departing from the teachings provided herein. Additional information regarding the production of short persistence luminescent materials is disclosed in U.S. Pat. No. 8,163,201 to Kingsley et al. the entire disclosure of which is incorporated herein by reference.

Additionally, or alternatively, the luminescent material 58, according to one embodiment, disposed within the luminescent structure 42 may include a long persistence luminescent material 58 that emits the converted light 66, once charged by the excitation light 62. The excitation light 62 may be emitted from any excitation source (e.g., any natural light source, such as the sun, and/or any artificial light source). The long persistence luminescent material 58 may be defined as having a long decay time due to its ability to store the excitation light 62 and release the converted light 66 gradually, for a period of several minutes or hours, once the excitation light 62 is no longer present.

The long persistence luminescent material 58, according to one embodiment, may be operable to emit light at or above an intensity of 0.32 mcd/m² after a period of 10 minutes. Additionally, the long persistence luminescent material 58 may be operable to emit light above or at an intensity of 0.32 mcd/m² after a period of 30 minutes and, in some embodiments, for a period substantially longer than 60 minutes (e.g., the period may extend 62 hours or longer, and in some instances, the period may extend 48 hours). Accordingly, the long persistence luminescent material 58 may continually illuminate in response to excitation from any light source 94 that emits the excitation light 62, including, but not limited to, natural light sources (e.g., the sun) and/or any artificial light source. The periodic absorption of the excitation light 62 from any excitation source may provide for a substantially sustained charge of the long persistence luminescent material 58 to provide for consistent passive illumination. In some embodiments, a light sensor may monitor the illumination intensity of the luminescent structure 42 and actuate an excitation source when the illumination intensity falls below 0.32 mcd/m², or any other predefined intensity level.

The long persistence luminescent material 58 may correspond to alkaline earth aluminates and silicates, for example doped di-silicates, or any other compound that is capable of emitting light for a period of time once the excitation light 62 is no longer present. The long persistence luminescent material 58 may be doped with one or more ions, which may correspond to rare earth elements, for example, $Eu^{2+}$, $Tb^{3+}$ and/or $Dy^3$. According to one non-limiting exemplary embodiment, the luminescent structure 42 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 42, according to one embodiment, may be a translucent white color, and in some instances reflective, when unilluminated. Once the luminescent structure 42 receives the excitation light 62 of a particular wavelength, the luminescent structure 42 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 62 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral luminescent structure 42. It will be understood that the compositions provided herein are non-limiting examples. Thus, any phosphor known in the art may be utilized within the luminescent structure 42 without departing from the teachings provided herein. Moreover, it is contemplated that any long persistence phosphor known in the art may also be utilized without departing from the teachings provided herein.

Additional information regarding the production of long persistence luminescent materials is disclosed in U.S. Pat. No. 8,163,201 to Agrawal et al., the entire disclosure of which is incorporated herein by reference. For additional information regarding long persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Referring to FIGS. 2-6, reference numeral 10 generally designates the climate status indicator 10 for the vehicle 14. The climate status indicator 10 includes a light guide 18 positioned around a vent perimeter 22. The climate status indicator 10 additionally includes a light device 26 coupled to at least one vent fin 30. The light guide 18 and/or the light device 26 are configured to provide a visual indicator of a climate status.

The climate status indicator 10, as disclosed herein, provides new features that visually indicate the vehicle's 14 climate control system operations which may be especially useful in electric vehicles. One such feature, for example, is the light guide 18 positioning around an outside edge of a vent or vent perimeter 22 that can provide a variable colored light that can pulse at one or more different rates to indicate information to a user about the climate status and/or other systems in the vehicle 14. Another such feature, for example, is the light device 26 that can also provide a variable colored light that can pulse at one or more different rates to indicate information to a user about the climate status and/or other systems in the vehicle 14. Yet another such feature, for example, is the display combination of a lighting color and/or a lighting pulse rate using the light guide 18 and/or the light device 26 to communicate information relating to an air conditioner (AC) status, a heater status, a fan status, an air quality status, a filter status, a vent pressure status, or a combination thereof.

Figure 2:
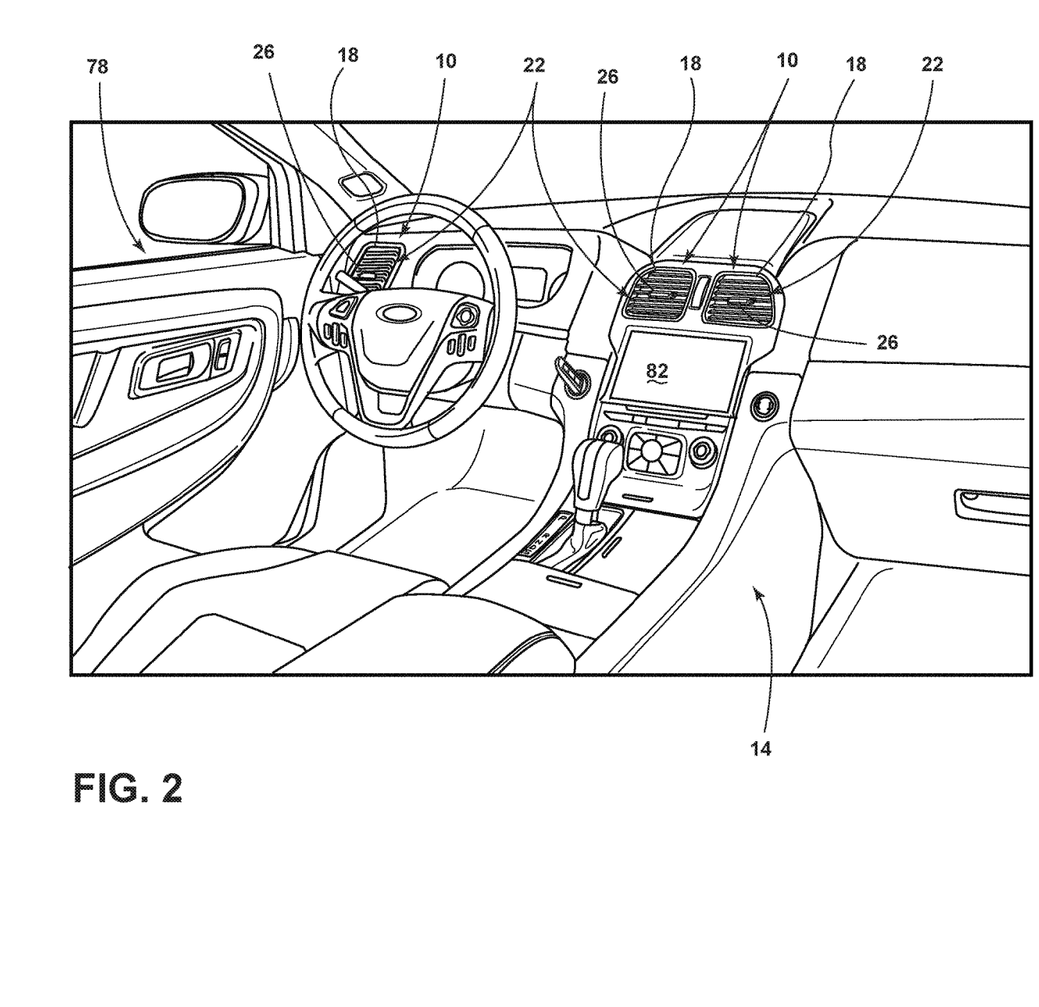
FIG. 2 is a perspective view of a passenger compartment in a vehicle showing a climate status indicator according to one aspect of the present disclosure.
Figure 3:
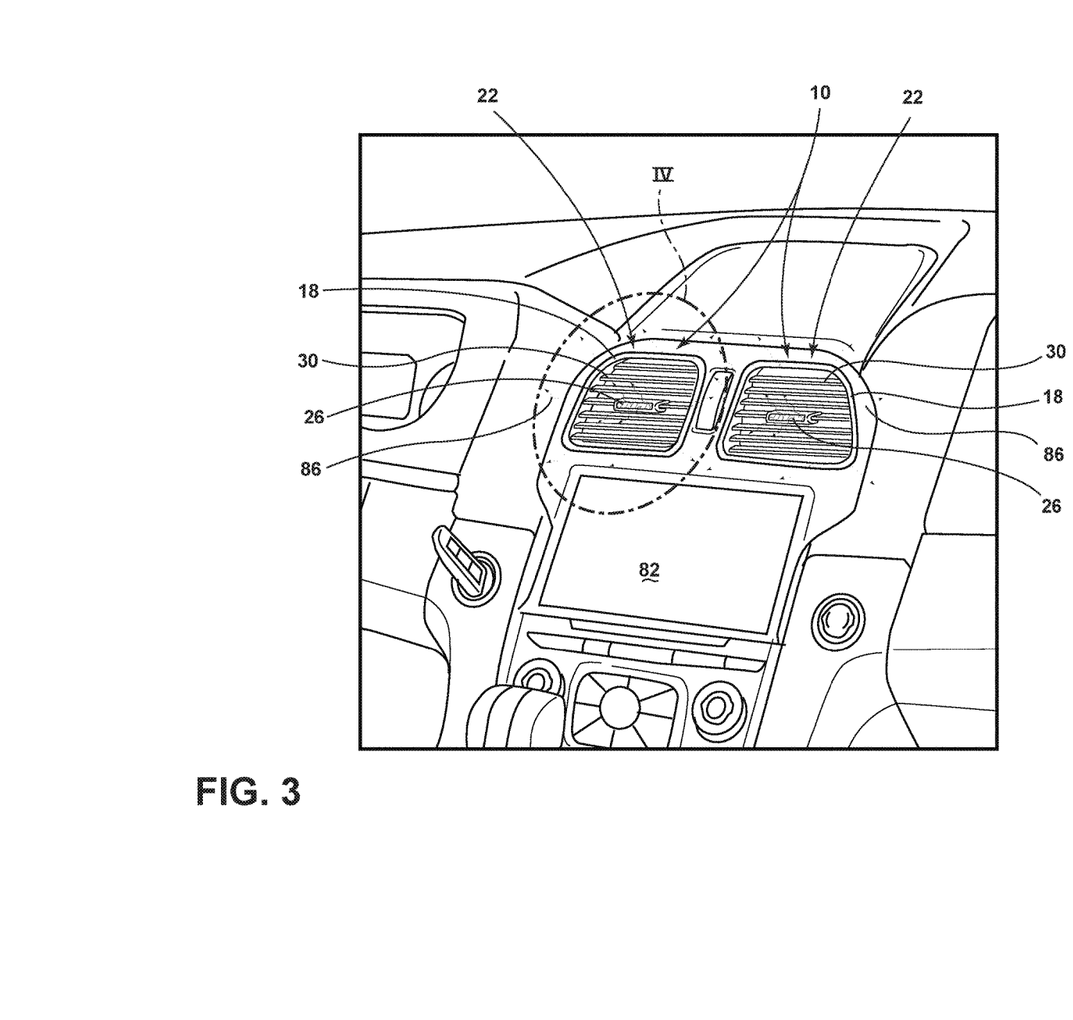
FIG. 3 is a perspective view of a climate status indicator according to one aspect of the present disclosure.

Referring now to FIG. 2, a passenger compartment 78 is shown in the vehicle 14 having at least one climate status indicator 10 provided. The one or more climate status indicators 10 are shown to include the light guide 18 positioned around the vent perimeter 22 and the light device 26 coupled to at least one vent fin 30 (as shown in FIG. 3). A display 82 can be used to help control and/or monitor one or more of the different systems being used in the vehicle 14 including, for example, the heating, ventilation, and air conditioning (HVAC) system, the audio system, or other systems or sensors in the vehicle 14.

Figure 4:
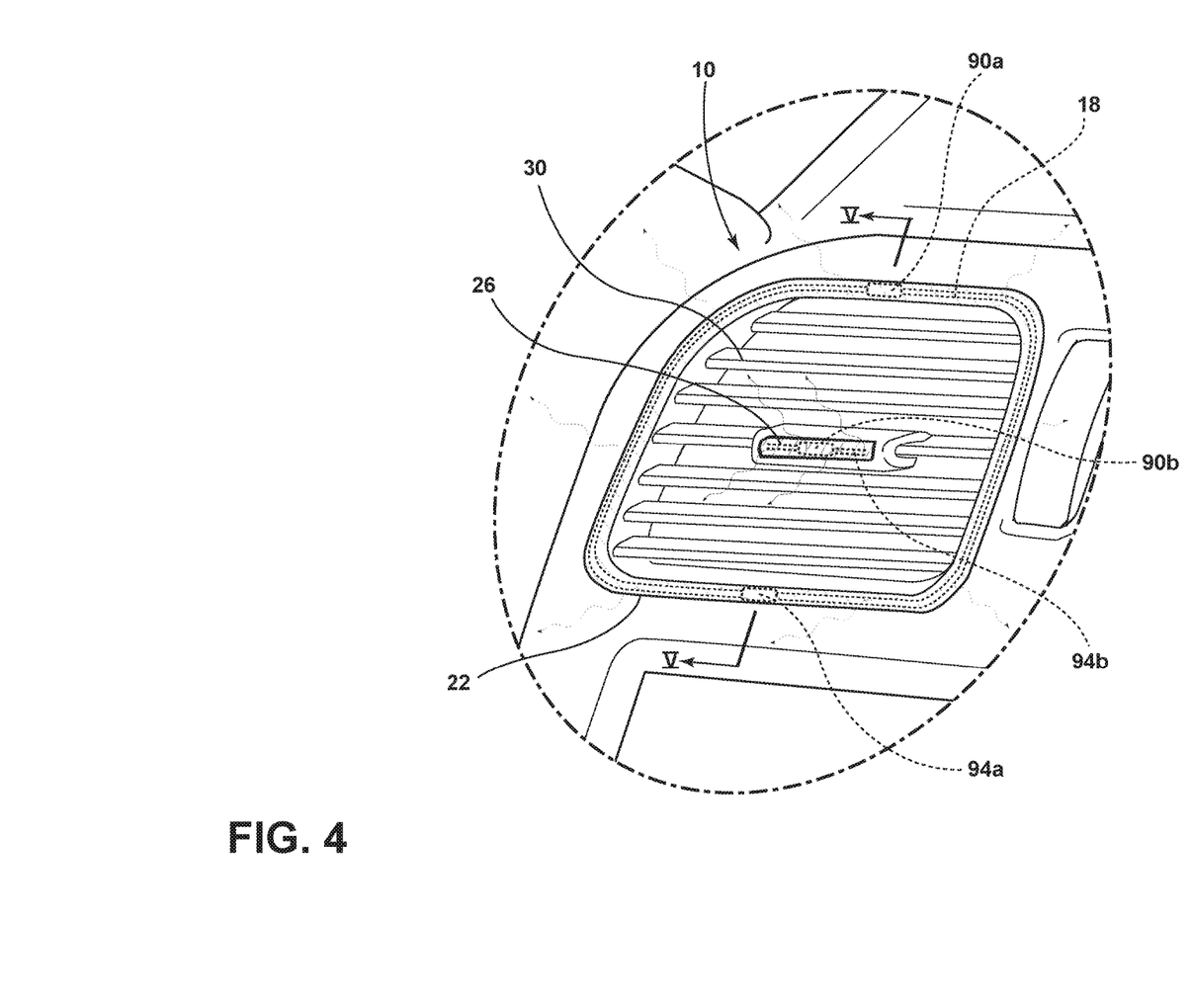
FIG. 4 is an expanded view of the climate status indicator provided in FIG. 3 according to one aspect of the present disclosure.
Figure 5:
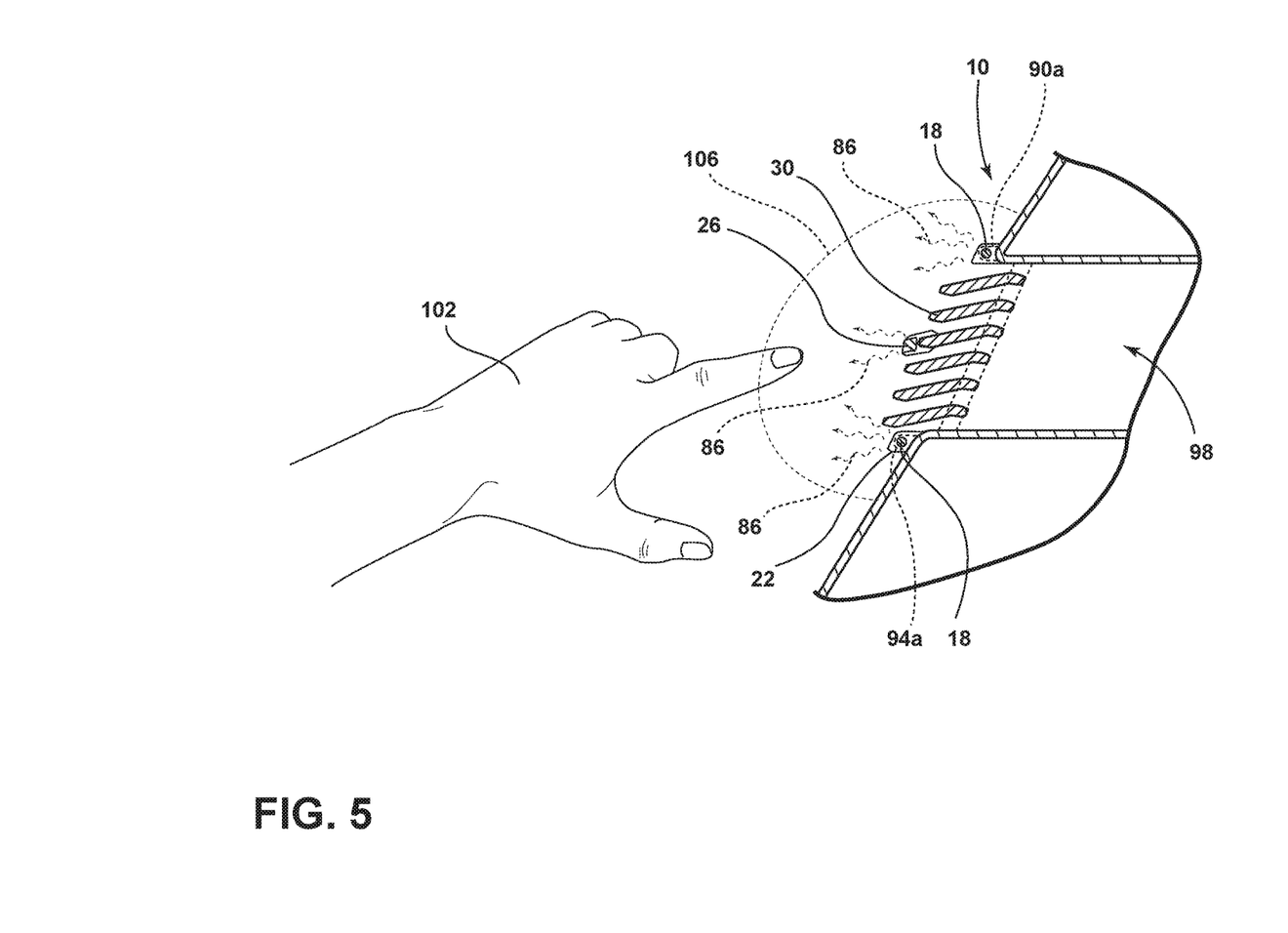
FIG. 5 is a cross-sectional view of the climate status indicator provided in FIG. 4 taken along the line V-V according to one aspect of the present disclosure.
Figure 6:
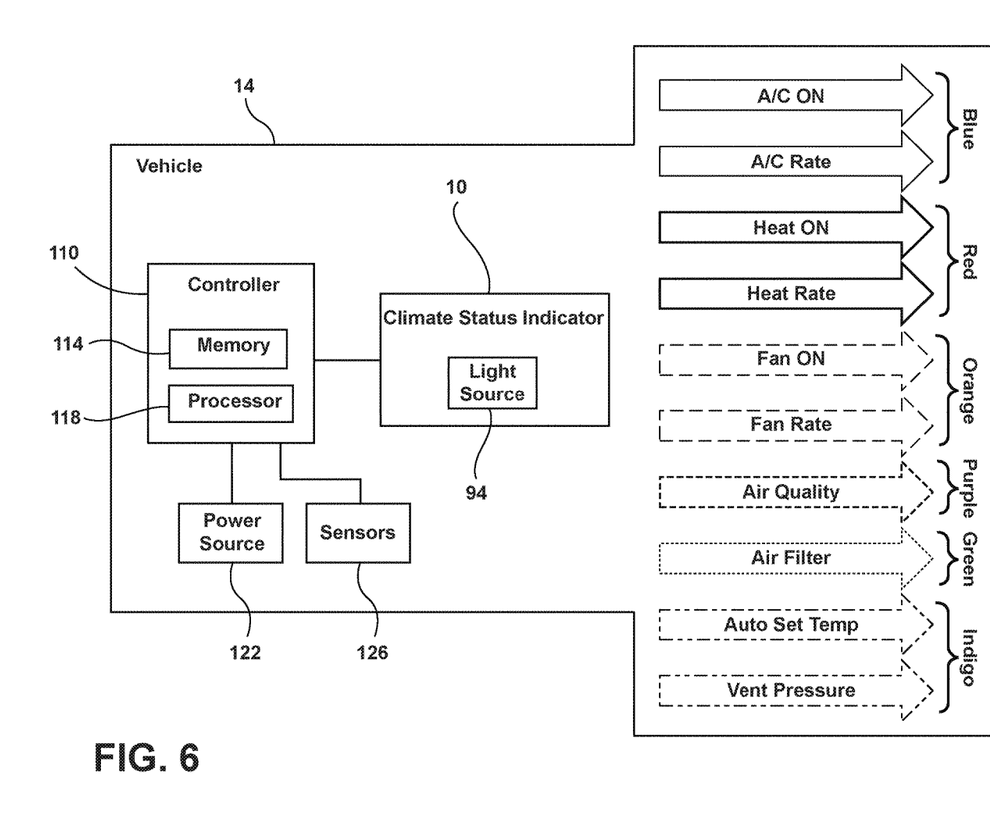
FIG. 6 a block diagram of a climate status indicator according to one aspect of the present disclosure.

In some aspects, the light guide 18 may include a first capacitive touch sensor 90a (as shown in FIG. 4) and/or the light device 26 may include a second capacitive touch sensor 90b (as shown in FIG. 4) used to activate or initiate the climate status indicator 10. The capacitive touch sensors 90 may each provide a capacitive sense activation field 106 (as shown in FIG. 6) to sense contact or close proximity (e.g., within one mm) of a user (e.g., finger) in relation to the corresponding capacitive sensor 90. The capacitive sense activation field 106 of each capacitive sensor 90 detects a user's finger or hand 102 (as shown in FIG. 5) which has an electrical conductivity and dielectric properties that cause a change or disturbance in the capacitive sense activation field 106 as should be evident to those skilled in the art.

The light guide 18 may be illuminated using a backlight and/or a light tube. The backlight light source for the light guide 18 may be configured to emit visible and/or non-visible light, such as blue light, UV light, infrared light (IR), and/or violet light and may include any other form of light source. When used as a light tube, the light guide 18 may be formed from a rigid material that is comprised of a curable substrate such as a polymerizable compound, a mold in clear (MIC) material or mixtures thereof. Acrylates are also used for forming rigid light pipes, as well as poly methyl methacrylate (PMMA), which is a known substitute for glass. A polycarbonate material may also be used in an injection molding process to form the rigid light guide 18. Further, the light guide 18 may be a flexible light guide, wherein a suitable flexible material is used to create the light guide 18. Such flexible materials include urethanes, silicone, thermoplastic polyurethane (TPU), or other like optical grade flexible materials. Whether the light guide 18 is flexible or rigid, the light guide 18, when formed, is substantially optically transparent and/or translucent and capable of transmitting excitation light 62. The light guide 18 may be referred to as an outer light guide, a light pipe, a light plate, a light bar or any other light carrying or transmitting substrate made from a clear or substantially translucent material.

The light device 26 may be illuminated using a backlight and/or a light tube. The backlight light source for the light device 26 may be configured to emit visible and/or non-visible light, such as blue light, UV light, infrared light (IR), and/or violet light and may include any other form of light source. When used as a light tube, the light guide in the light device 26 may be formed from a rigid material that is comprised of a curable substrate such as a polymerizable compound, a mold in clear (MIC) material or mixtures thereof. The light guide positioned in the light device 26 may be referred to as a light pipe, a light plate, a light bar or any other light carrying or transmitting substrate made from a clear or substantially translucent material.

The light device 26, as used herein, is defined to include any vent button light, vent button, vent control knob, ventral control handle, vent open and close button, vent open and close dial, vent control switch, vent control button, and/or other vent control or connector. In some aspects, the light device 26 may be positioned in a center grill portion of the vent fins 30. In other aspects, the light device 26 may be a dial or a control handle positioned proximate the vent. In still other aspects, the light device 26 may be a vent button light device.

Referring now to FIG. 3, the climate status indicator 10 is shown in an activated mode where the visual indicator is light 86. The light 86 may be radiated out from the light guide 18 positioned around the perimeter 22 of the vent and/or the light device 26. Either the light guide 18 and/or the light device 26 may be configured to indicate a fan speed using a lighting pulse rate or a lighting color to indicate an air temperature. In some aspects, upon initialization and lighting up the climate status indicator 10, the climate status indicator 10 may additionally activate the display 82 to display a climate control screen or interface to control the HVAC system. In some aspects, the climate control indicator 10 is configured to activate the climate control screen on the display 82 when the climate status indicator 10 is touched or activated.

The light guide 18 and/or the light device 26 may be configured to communicate information to the user by using lighting color and/or lighting pulse rate of the respective lights 18, 26. In some aspects, the light guide 18 is configured to indicate a fan speed using a lighting pulse rate and to indicate an air temperature using a lighting color. In other aspects, the light device 26 is configured to indicate a desired fan speed using a lighting pulse rate and to indicate a desired air temperature using a lighting color. In some aspects, the light device 26 is configured to indicate a desired fan speed using a lighting pulse rate and to indicate a desired air temperature using a lighting color. In other aspects, the visual indicator for the light guide 18 and/or the light device 26 is a lighting color, a lighting pulse rate, or a combination thereof.

Referring now to FIG. 4, an exploded view of the climate status indicator 10 is provided as coupled to one of the vents. The climate status indicator 10 includes a capacitive sensor or switch 90 and a light source 94 directly coupled to the respective lighting mechanism provided in the light guide 18 and the light device 26. The light device 26 may separately include a button light source 90b and a button capacitive sensor 94b while the light guide 18 may additionally and separately include a guide light source 90a and a guide capacitive sensor 94a. In some aspects, both the light device 26 and the light guide 18 may include the same capacitive switch 90 and light source 94.

As illustrated in FIG. 5, a cross-sectional view of the climate status indicator 10 positioned in a HVAC duct 98 is provided. The climate status indicator 10 may be positioned on one or more of the vents or vent openings located at the end of one or more HVAC ducts 98 in the vehicle 14. As shown, the climate status indicator 10 is configured to emit the activation field 106. The activation field 106 extends outwardly from the climate status indicator 10 and vent. According to various aspects, the capacitive sensor 90 is activated when an object such as the user's finger or hand 102 is proximate and/or comes in contact with the capacitive sensor 90. In some aspects, the capacitive sensor 90 is activated when the finger or hand 102 crosses into the activation field 106. In other aspects, the capacitive sensor 90 is activated when the finger or hand 102 crosses into the activation field 106 and touches the light guide 18 and/or light device 26. Upon activation of the capacitive sensor 90, the light source 94 projects light 86 through the light guide 18 and/or light device 26 to communicate with the user.

Referring now to FIG. 6, a box diagram of the vehicle 14 is depicted in which the climate status indicator 10 is implemented. The vehicle 14 includes a controller 110 in communication with the climate status indicator 10. The controller 110 may include a memory 114 having instructions contained therein that are executed by a processor 118 of the controller 110. The controller 110 may provide electrical power to the climate status indicator 10 via a power source 122 located onboard the vehicle 14. In addition, the controller 110 may be configured to control the light output from the light source 94. The light output provided from the light source 94 may include a variety of different lighting colors including, for example, blue, red, orange, purple, green, indigo, yellow, and/or violet. The light output provided from the light source 94 may additionally be varied in the length of transmission. For example, the light output may be pulsed at various intervals including 0.1 seconds, 0.25 seconds, 0.50 seconds, 0.75 seconds, 1 second, 1.5 seconds, 2.0 seconds, 5.0 seconds, 10 seconds, 30 seconds, 1 minute, and/or the light output may be left on continuously. In some aspects, the light output may be configured to include any combination of pulses and/or continuous lighting portions to communicate information to the user.

Still referring to FIG. 6, the controller 110 may receive information from one or more sensors 126. The one or more sensors 126 may include a vent pressure sensor, a variable air conditioner compressor sensor, an electric air conditioner compressor sensor, an electric heater sensor, an air conditioner sensor, a power sensor, an air quality sensor, an air filter sensor, an air temperature sensor, a fan speed sensor, a vent opening sensor, or a combination thereof. Depending on what sensor is sending information to the controller, a predetermined lighting color and lighting pulse rate is used to transmit information about that particular sensor to the user. For example, in some aspects, a blue lighting color may be used to transmit information to the user regarding the air conditioner status, a red lighting color may be used to transmit information to the user regarding the heater status, an orange lighting color may be used to transmit information to the user regarding the fan status, a purple lighting color may be used to transmit information to the user regarding the air quality status, a green lighting color may be used to transmit information to the user regarding the air filter status, and an indigo lighting color may be used to transmit information to the user regarding the vent pressure status and/or auto set temperature. The assignment of any particular lighting color to transmit information regarding any respective air quality and/or any mechanical/electrical system found or used in a vehicle 14 may be varied as appreciated by one skilled in the art.

Figure 7:
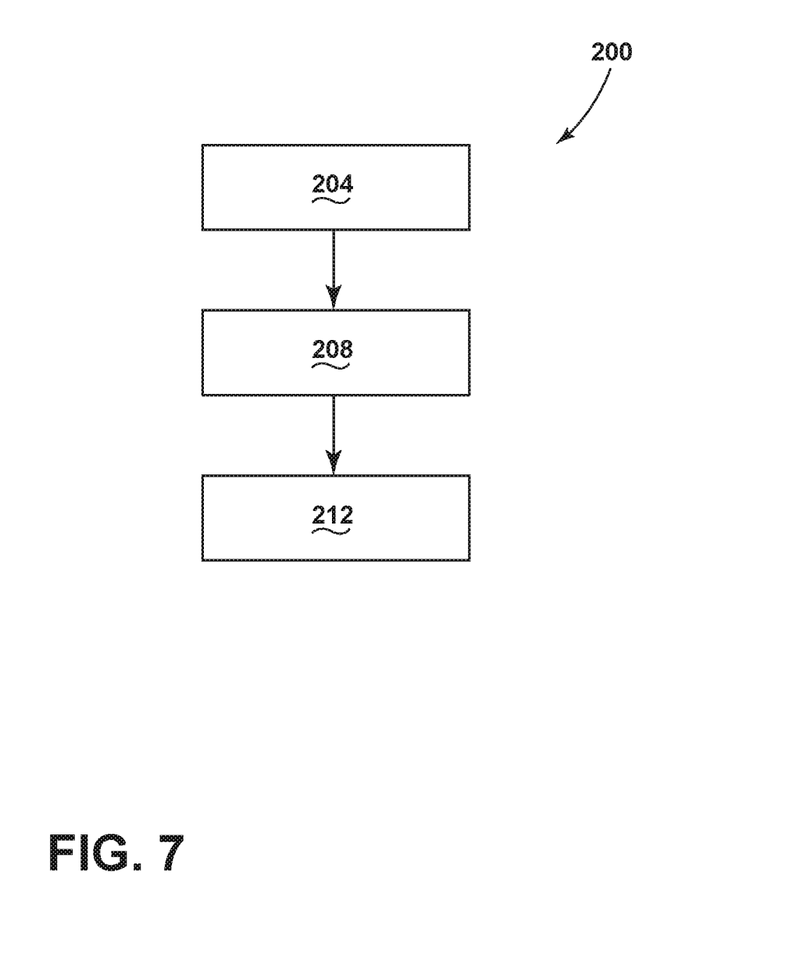
FIG. 7 is a flow diagram of a method of visually monitoring a climate system in a vehicle according to one aspect of the present disclosure.

Referring now to FIG. 7, with continued reference to FIGS. 1-6, a method 200 for generating a visual indication for a climate system in the vehicle 14 is shown. The method 200 may begin with a step 204 that includes sensing with a sensor a user touching the light guide 18 and/or the light device 26 on the vent. In some aspects, the sensor may include the capacitive sensor 90 that is activated when the user's finger or hand 102 is proximate and/or comes in contact with the capacitive sensor 90a of the light device 26 and/or the capacitive sensor 90b of the light guide 18. In some aspects, the capacitive sensor 90 is activated when the finger or hand 102 crosses into the activation field 106. In other aspects, the capacitive sensor 90 is activated when the finger or hand 102 crosses into the activation field 106 and touches the light guide 18 and/or light device 26. Upon activation of the capacitive sensor 90, the light source 94 projects light 86 through the light guide 18 and/or light device 26 to communicate with the user.

Next is a step 208 of activating a light source to generate one or more visual indicators including a lighting color, a lighting pulse rate, or a combination thereof. In some aspects, the one or more visual indicators may include a lighting color, a lighting pulse rate, or a combination thereof. As previously described, the lighting color may include, for example, blue, red, orange, purple, green, indigo, yellow, and/or violet. Any one or more of the available lighting colors in the climate status indicator may be assigned to represent information related to a vent pressure sensor, a variable air conditioner compressor sensor, an electric air conditioner compressor sensor, an electric heater sensor, an air conditioner sensor, a power sensor, an air quality sensor, an air filter sensor, an air temperature sensor, a fan speed sensor, a vent opening sensor, or a combination thereof. The correlation between a given lighting color and information provided from a respective sensor may be varied depending on the desired application and/or environment provided for the climate status indicator 10.

Next is a step 212 of selecting the desired sensor 126 the user wants to receive information about by repeatedly touching or swiping the climate status indicator 10 to cycle to the desired sensor 126 or system. Upon activation of the climate status indicator 10, the climate status indicator 10 may be configured to begin providing information to the user using a specific lighting color related to a specific sensor. If the user desires to observe information regarding a different system and/or sensor, the use may be able to cycle through or select a different lighting color and respective sensor/system by reactivating the capacitive sensor 90 by swiping or touching the finger or hand 102 through the activation field 106 again. In some aspects, the user may be able to cycle through the various colored lights and corresponding sensors/systems to obtain information for the desired sensors/systems.

It is understood that the descriptions outlining and teaching the climate status indicator 10 previously discussed, which can be used in any combination, apply equally well to the method 200 for visually monitoring a climate system in the vehicle 14.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A climate status indicator in a vehicle, comprising:
   a light guide positioned around a perimeter of a vent; and
   a light device operatively coupled to at least one vent fin of the vent;
   wherein the light guide and/or the light device provide a visual climate status to indicate a fan speed or a desired fan speed that controls climate in the vehicle using a lighting pulse rate.

2. The climate status indicator of claim 1, wherein the light guide comprises a first capacitive touch sensor.

3. The climate status indicator of claim 1, wherein the light device comprises a second capacitive touch sensor.

4. The climate status indicator of claim 1, wherein the light guide is configured to indicate the fan speed using the lighting pulse rate and to indicate an air temperature using a lighting color.

5. The climate status indicator of claim 1, wherein the light device is configured to indicate the desired fan speed using the lighting pulse rate and to indicate a desired air temperature using a lighting color.

6. The climate status indicator of claim 1, wherein the climate status indicator is configured to activate a climate control screen on a display when the climate status indicator is touched.

7. The climate status indicator of claim 1, wherein the climate status indicator is controlled by a controller, wherein the controller receives information from a vent pressure sensor, a variable air conditioner compressor sensor, an electric air conditioner compressor sensor, an electric heater sensor, an air conditioner sensor, a power sensor, an air quality sensor, an air filter sensor, an air temperature sensor, a fan speed sensor, a vent opening sensor, or a combination thereof.

8. The climate status indicator of claim 1, wherein the visual climate status indicator further comprises a lighting color.

9. The climate status indicator of claim 8, wherein the lighting color is blue to indicate an air conditioner status, red to indicate a heater status, orange to indicate a fan status, purple to indicate an air quality status, green to indicate a filter status, indigo to indicate a vent pressure status, or a combination thereof.

10. The climate status indicator of claim 1, further comprising:
   a luminescent structure disposed on a vehicle and excitable by emitted light from a light source.

11. A climate status indicator in a vehicle, comprising:
   a vent having an opening having a light guide with a first capacitive touch sensor; and
   a light device having a second capacitive touch sensor, wherein the light device is coupled to at least one vent fin of the vent;
   wherein the light guide and/or the light device to provide a visual climate status to indicate a fan speed or desired fan speed that controls climate in the vehicle using a lighting pulse rate.

12. The climate status indicator of claim 11, wherein the light guide is configured to indicate the fan speed using the lighting pulse rate and to indicate an air temperature using a lighting color.

13. The climate status indicator of claim 11, wherein the light device is configured to indicate the desired fan speed using the lighting pulse rate and to indicate a desired air temperature using a lighting color.

14. The climate status indicator of claim 11, wherein the visual climate status indicator further comprises a lighting color.

15. The climate status indicator of claim 14, wherein the lighting color is blue to indicate an air conditioner status, red to indicate a heater status, orange to indicate a fan status, purple to indicate an air quality status, green to indicate a filter status, indigo to indicate a vent pressure status, or a combination thereof.

16. The climate status indicator of claim 11, wherein the climate status indicator is configured to activate a climate control screen on a display when the climate status indicator is touched.

17. A method of generating a visual indication for a climate system in a vehicle, the method comprising:
   sensing, with a sensor, a user touching a light guide positioned around a perimeter or a light device coupled to at least one vent fin of the vent; and
   activating a light source to generate one or more visual climate status indicators via the light guide or the light device, wherein the one or more visual climate status indicators comprises a lighting color, a lighting pulse rate, or a combination thereof based on the sensed touch, wherein a fan speed or desired fan speed that controls the climate in the vehicle is indicated using the lighting pulse rate.

18. The method of visually monitoring a climate system of claim 17, wherein the climate status indicator is configured to activate a climate control screen on a display when the climate status indicator is touched.

19. The method of visually monitoring a climate system of claim 17, wherein the climate status indicator is controlled by a controller wherein the controller receives information from a vent pressure sensor, a variable air conditioner compressor sensor, an electric air conditioner compressor sensor, an electric heater sensor, an air conditioner sensor, a power sensor, an air quality sensor, an air filter sensor, an air temperature sensor, a fan speed sensor, a vent opening sensor, or a combination thereof.

20. The method of visually monitoring a climate system of claim 17, wherein the lighting color is blue to indicate an air conditioner status, red to indicate a heater status, orange to indicate a fan status, purple to indicate an air quality status, green to indicate a filter status, indigo to indicate a vent pressure status, or a combination thereof.

\* \* \* \* \*

UNITED STATES PATENT AND TRADEMARK OFFICE
CERTIFICATE OF CORRECTION

Page 1 of 1

PATENT NO. : 10,179,542 B1
APPLICATION NO. : 15/787873
DATED : January 15, 2019
INVENTOR(S) : Salter et al.

It is certified that error appears in the above-identified patent and that said Letters Patent is hereby corrected as shown below:

In the Claims

Column 13:
Claim 11, Line 20:
After "device" delete "to".

Column 14:
Claim 17, Line 8:
After "around a" insert --vent--.

Signed and Sealed this
Ninth Day of April, 2019

Andrei Iancu
*Director of the United States Patent and Trademark Office*